(12) United States Patent
Darcy

(10) Patent No.: US 8,769,071 B2
(45) Date of Patent: Jul. 1, 2014

(54) DYNAMIC MAPPING OF IDENTIFIERS IN A MULTI-TENANT COMPUTING SYSTEM

(75) Inventor: Jeffrey J. Darcy, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 343 days.

(21) Appl. No.: 13/035,527

(22) Filed: Feb. 25, 2011

(65) Prior Publication Data

US 2012/0221694 A1 Aug. 30, 2012

(51) Int. Cl.
*G06F 15/173* (2006.01)

(52) U.S. Cl.
USPC .......................................................... 709/223

(58) Field of Classification Search
None
See application file for complete search history.

(56) References Cited

U.S. PATENT DOCUMENTS

| | | | |
|---|---|---|---|
| 8,117,129 B2 * | 2/2012 | Saunders et al. ................ | 705/44 |
| 8,386,431 B2 * | 2/2013 | Hahn et al. ..................... | 707/649 |
| 8,626,891 B2 * | 1/2014 | Guru et al. ..................... | 709/223 |
| 2007/0156902 A1 * | 7/2007 | Becker .......................... | 709/226 |
| 2011/0213870 A1 * | 9/2011 | Cai et al. ....................... | 709/223 |
| 2011/0264861 A1 * | 10/2011 | Fee et al. ....................... | 711/122 |
| 2011/0265066 A1 * | 10/2011 | Fee et al. ....................... | 717/139 |
| 2011/0265069 A1 * | 10/2011 | Fee et al. ....................... | 717/151 |
| 2011/0276674 A1 * | 11/2011 | Jensen-Horne et al. ....... | 709/223 |
| 2011/0289091 A1 * | 11/2011 | Collins et al. ................. | 707/741 |
| 2012/0079134 A1 * | 3/2012 | Outhred et al. ............... | 709/244 |
| 2012/0110156 A1 * | 5/2012 | Guru et al. .................... | 709/223 |
| 2012/0174085 A1 * | 7/2012 | Driesen et al. ................ | 717/168 |
| 2012/0204030 A1 * | 8/2012 | Nossik et al. ................. | 713/168 |
| 2013/0290506 A1 * | 10/2013 | Astete et al. .................. | 709/223 |

FOREIGN PATENT DOCUMENTS

| | | | | |
|---|---|---|---|---|
| GB | 2461803 A | * | 1/2010 | |
| JP | 2012065015 A | * | 3/2012 | |
| KR | 2011072102 A | * | 6/2011 | |

OTHER PUBLICATIONS

Aulbach, Stefan et al. "A comparison of flexible schemas for software as a service." Proceedings of the 2009 ACM SIGMOD International Conference on Management of data. Jun. 2009. ACM Press. 881-888.*

Bezemer, Cor-Paul et al. "Multi-tenant SaaS applications: maintenance dream or nightmare?" Proceedings of the Joing ERCIM Workshop on Software Evolution (EVOL) and International Workshop on Principles of Software Evolution (IWPSE). ACM Press. Sep. 2010. 88-92.*

"Multitenancy", accessed at: http://en.wikipedia.org/wiki/Multitenancy on Dec. 20, 2010, last updated Dec. 13, 2010, 4 pages.

(Continued)

*Primary Examiner* — Jeffrey R Swearingen

(74) *Attorney, Agent, or Firm* — Lowenstein Sandler LLP

(57) ABSTRACT

Some embodiments of a system and a method to dynamically create mappings between tenant-specific user identifiers (IDs) and global user IDs in a multi-tenant computing system have been presented. In response to a request to map a tenant user identifier (ID) pair comprising a tenant identifier (ID) and a tenant-specific user ID, a server in a networked system creates a mapping of the tenant user ID pair to a global user ID that is not yet used. The server is communicably coupled to other servers in the networked system, and the tenant ID is associated with a tenant in the networked system. The server may immediately makes the mapping of the tenant user ID pair to the global user ID available to the other servers in the networked system.

12 Claims, 4 Drawing Sheets

(56) References Cited

OTHER PUBLICATIONS

Chong, Frederick et al., "Multi-Tenant Data Architecture", accessed at: http://msdn.microsoft.com/en-us/library/aa479086.aspx on Mar. 10, 2011, published Jun. 2006, 18 pages.

Chong, Frederick et al., "Architecture Strategies for Catching the Long Tail", accessed at: http://msdn.microsoft.com/en-us/library/aa479069.aspx on Mar. 10, 2011, published Apr. 2006, 22 pages.

Misra, Alok, "Why Multitenancy Matters in the Cloud", accessed at: http://www.informationweek.com/cloud-computing/blog/archives/2010/02/why_multitenanc.html on Dec. 20, 2010, published Feb. 26, 2010, 3 pages.

Vogels, Werner, "All Things Distributed: Amazon's Dynamo", accessed at: http://www/allthingsdistributed.com/2007/10/amazons_dynamo.html on Nov. 2, 2010, published Oct. 2, 2007, 17 pages.

* cited by examiner

DYNAMIC MAPPING OF IDENTIFIERS IN A MULTI-TENANT COMPUTING SYSTEM

TECHNICAL FIELD

Embodiments of the present invention relate to multi-tenant computing systems, and more specifically to mappings of user identifiers in a multi-tenant computing system.

BACKGROUND

Multi-tenancy refers to a principle in software architecture where a single instance of the software runs on a server, serving multiple client organizations (a.k.a., tenants). Multi-tenancy is contrasted with a multi-instance architecture, where separate software instances (or hardware systems) are set up for different client organizations. With a multitenant architecture, a software application can be designed to virtually partition its data and configuration, and each client organization works with a customized virtual application instance.

Multi-tenancy allows for cost savings over many other types of architecture because the cost of providing computing resources can be consolidated and shared by multiple tenants. Further, management of software release can also be greatly simplified in a multitenant computing system. However, the sharing of computing resources among different client organizations also raises other issues. For instance, security of a client organization's data is one important issue in a multi-tenant system.

BRIEF DESCRIPTION OF THE DRAWINGS

The present invention is illustrated by way of example, and not by way of limitation, in the figures of the accompanying drawings and in which.

DETAILED DESCRIPTION

Described herein are some embodiments of a method, an apparatus, and a system to dynamically create mappings between tenant-specific user identifiers (IDs) and global user IDs in a multi-tenant computing system. In one embodiment, a networked system includes at least one server serving at least one tenant. A tenant is a client organization that subscribes to computing services offered by the networked system. The computing services may include software applications, data storage, etc. For example, the tenant may be a bank, a medical group, an insurance company, etc., and the computing services may include databases to store customer and account information, accounting software, claim processing applications, etc. Note that there may be multiple tenants sharing the computing services offered by the networked system. Thus, the networked system is also commonly referred to as a multi-tenant computing system or simply as a multi-tenant system. A tenant may be identified by a tenant identifier (ID). Further, users belonging to the same tenant may be identified by tenant-specific user IDs.

In some embodiments, each combination of the tenant IDs and tenant-specific user IDs are dynamically mapped to global user IDs used within the networked system in a secure, consistent, and efficient manner. For instance, in response to a request to map a tenant user ID pair having a tenant ID and a tenant-specific user ID, a server in a networked system may create a mapping of the tenant user ID pair to a global user ID that is not yet used. The server is communicably coupled to other servers in the networked system, and the tenant ID is associated with a tenant in the networked system. The server may immediately make the mapping of the tenant user ID pair to the global user ID available to the other servers in the networked system. As such, the likelihood of redundant mapping of IDs can be greatly reduced. Furthermore, the above approach also provides more efficient and consistent mappings of IDs, which in turn, can reduce the likelihood of erroneously allowing access to data or computing resources to the wrong tenant. More details of some embodiments of how to dynamically create mappings between tenant-specific user IDs and global user IDs in a multi-tenant computing system are described below.

Figure 1:
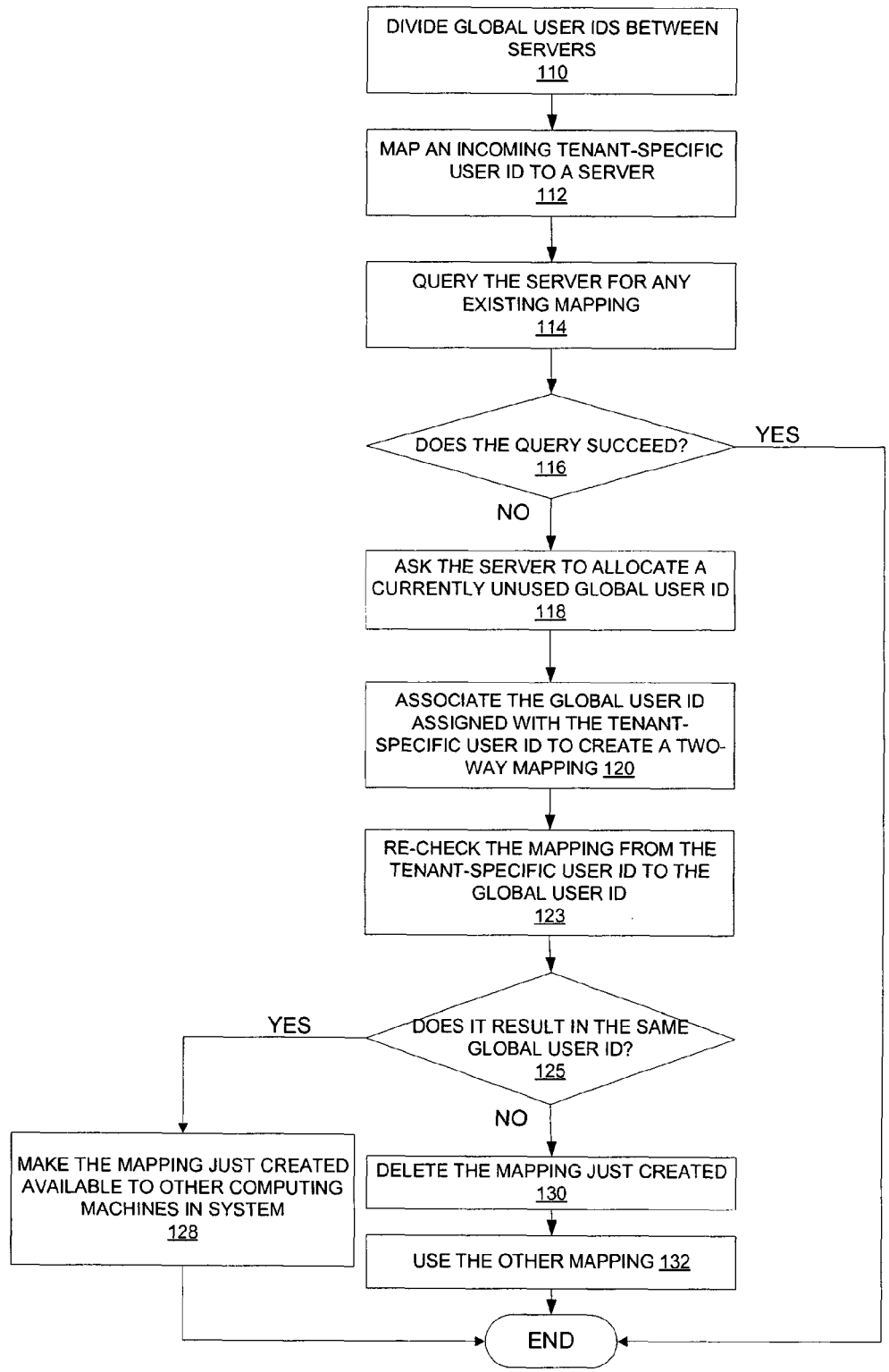
FIG. 1 illustrates a flow diagram of one embodiment of a method to dynamically create mappings between tenant-specific user identifiers and global user identifiers in a multi-tenant computing system.

FIG. 1 illustrates a flow diagram of one embodiment of a method to dynamically create mappings between tenant-specific user identifiers and global user identifiers in a multi-tenant computing system. The method may be performed by processing logic that may comprise hardware (e.g., circuitry, dedicated logic, programmable logic, microcode, etc.), software (such as instructions run on a processing device), firmware, or a combination thereof. For instance, the ID mapping manager 200 illustrated in FIG. 2 may perform at least part of the method in some embodiments.

In some embodiments, the mappings created are two-way mappings between tenant-specific user IDs and global user IDs, unlike some conventional client-server systems, where mappings are merely one-way. A two-way mapping, if correctly implemented, should map a unique tenant-specific user ID to a unique global user ID, such that lookups in both directions should result in the same pair of tenant-specific user ID and global user ID. Thus, such mapping is two-way. In contrast, a one-way mapping allows multiple tenant-specific user IDs (e.g., tenant-specific user ID A and tenant-specific user ID B) to map to the same global user ID (e.g., global user ID X). Hence, while a lookup using tenant-specific user ID A always result in global user ID X, a lookup in the other direction using global user ID X may not result in tenant-specific user ID A. Thus, such mapping is one-way. In systems where two-way mappings are created, the server used for the lookup in one direction might not be the same as the server used for the inverse. It is also important that "race conditions" are prohibited. In a race condition, two simultaneous requests are processed, possibly by different servers in the same system, such that redundant mappings in either direction are resulted. In the worst case, where two tenant-specific user IDs are mapped to the same global user ID, one could end up allowing access to computing resource (e.g., a file) by the wrong user, possibly one not even associated with the same tenant or organization associated with the tenant. Thus, the following procedures may be implemented to create a new mapping to prevent the race conditions discussed above.

In some embodiments, processing logic divides a set of global user IDs between servers in the system so that each server knows the set for which it is authoritative (processing block 110). For example, processing logic may apply consistent hashing to divide the global user IDs. In some embodiments, consistent hashing is applied in both directions. That is, consistent hashing may also be applied to the tenant ID and user ID pair to determine a server, which might need to allocate a new global user ID. As mentioned above, in the absence of coordination, that could lead to races where two servers allocate the same global user ID. Furthermore, if the two servers share a common global user ID pool, then naively-implemented coordination could be very inefficient. One technique described herein is to make each server a part of two consistent-hashing sets, one for tenant ID and user ID pairs and one for global user IDs. As such, each server is uniquely responsible for a subset in each. Thus, it can create two-way mappings between those two subsets very efficiently, without communicating with other servers, and without danger of races and such. Referring back to FIG. 1, processing logic maps an incoming tenant-specific user ID to a server (processing block 112), and queries that server for any existing mapping (processing block 114). Processing logic checks if the query succeeds (processing block 116). If the query succeeds, then the process ends because a mapping has already been created previously. Otherwise, the process continues in block 118 to create a mapping.

At block 118, processing logic asks the server to allocate a currently unused global user ID. Then processing logic associates the global user ID assigned with the tenant-specific user ID to create a two-way mapping (processing block 120).

In some embodiments, processing logic re-checks the mapping just created from the tenant-specific user ID to the global user ID (processing block 123). Specifically, processing logic can re-check the mapping by querying the tenant-specific user ID again. If another server has also created a mapping for the tenant-specific user ID at about the same time, then the query would result in a different global user ID, which may lead to granting access of resources to the wrong user, and hence, the newly created mapping has to be deleted. At block 125, processing logic checks if it results in the same global user ID (processing block 125). If it does, then processing logic makes the mapping just created available to other computing machines in the system (processing block 128), and then the process ends. Otherwise, if it does not result in the same global user ID, then processing logic deletes the mapping just created (processing block 130) and uses the other mapping (processing block 132).

By re-checking the two-way mapping just created from the tenant-specific user ID to the global user ID, processing logic can detect if another server has simultaneously processed another request for the same tenant-specific user ID. If so, then processing logic can delete the redundant mapping created to avoid inconsistency in mappings and granting the wrong user access to computing resources in the system. As mentioned above, global user IDs are securely, efficiently, and consistently mapped to tenant-specific user IDs. Servers in the networked system, as well as software applications running on these servers, may use the global user IDs to correctly access the resources (e.g., data) used or belonged to specific tenants.

Figure 2:
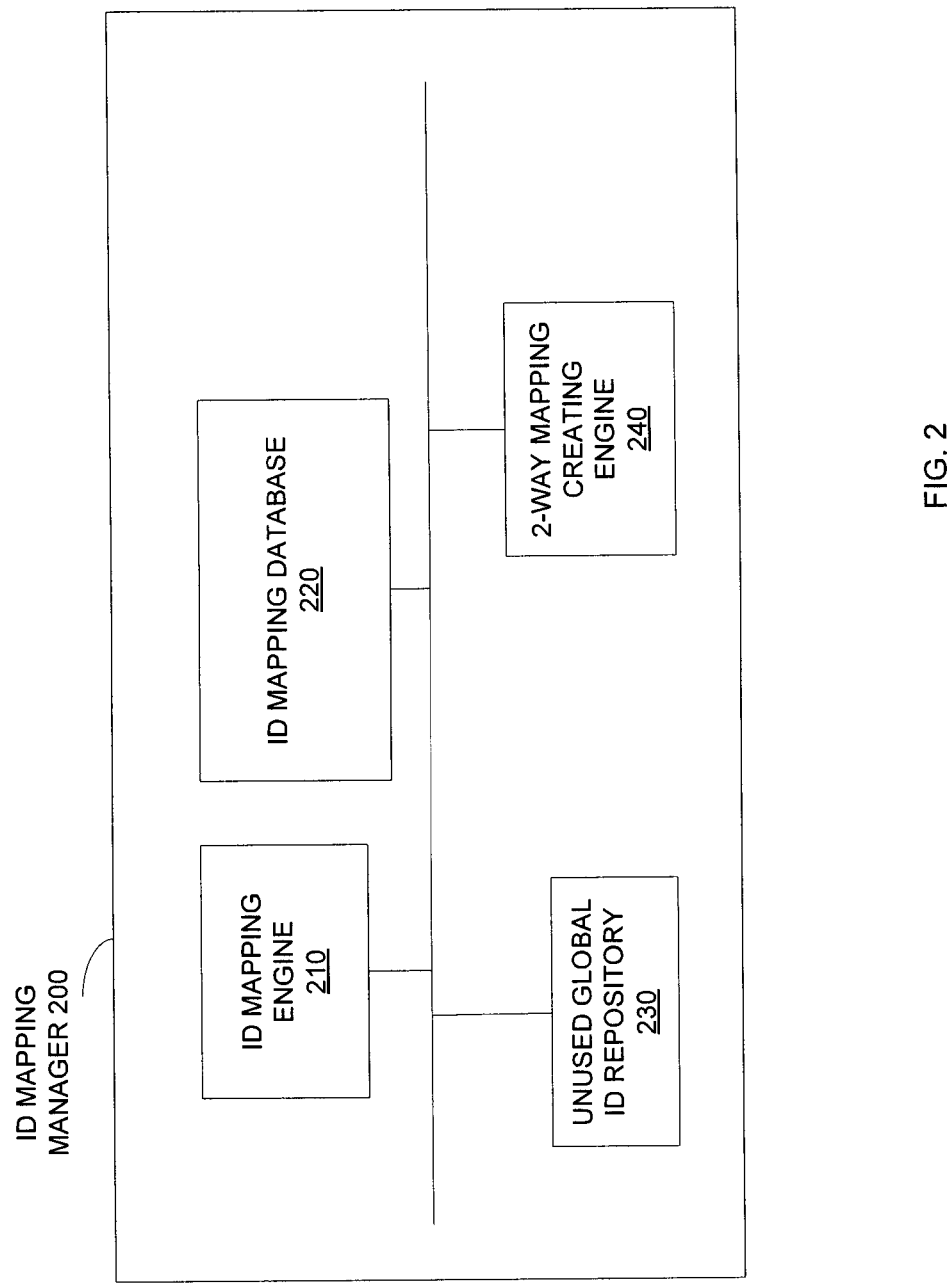
FIG. 2 illustrates one embodiment of an identifier mapping manager.
Figure 4:
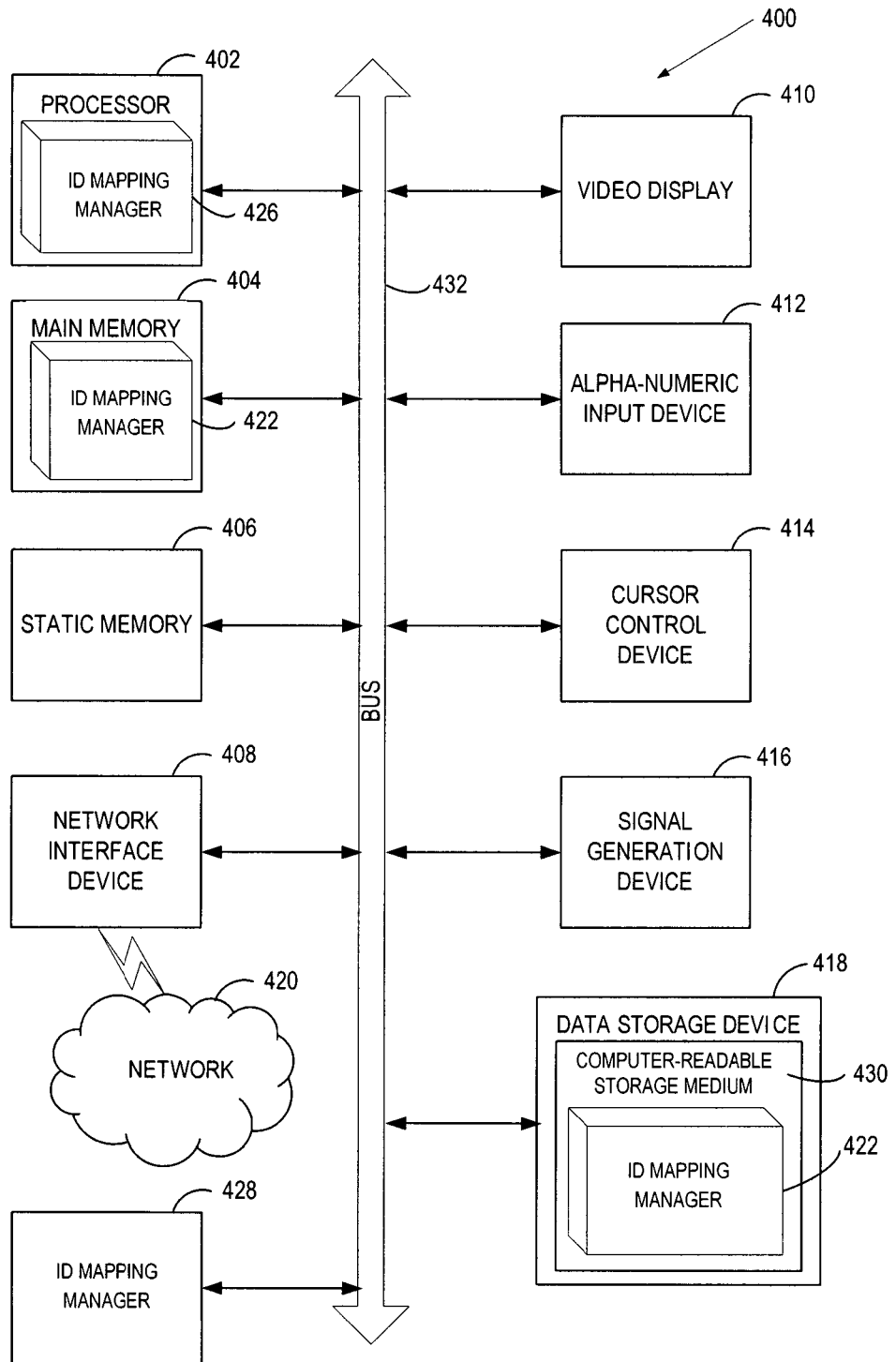
FIG. 4 illustrates a block diagram of an exemplary computer system.

FIG. 2 illustrates one embodiment of an identifier mapping manager usable in one embodiment of a multi-tenant computing system. The identifier mapping manager may perform at least part of the method discussed above. In some embodiments, the identifier mapping manager can be implemented on a computer system, such as a server, a desktop personal computer, a laptop computer, etc. An exemplary embodiment of a computer system is shown in FIG. 4.

In some embodiments, the identifier mapping manager 200 includes an identifier (ID) mapping engine 210, an ID mapping database 220, an unused global ID repository 230, and a two-way mapping creating engine 240, all of which coupled to each other. Other embodiments of the identifier mapping manager 200 may include more or fewer components than those shown in FIG. 2.

In some embodiments, the ID mapping engine 210 receives a tenant-specific user ID from another computing machine in the system. For example, the other computing machine may submit a request to access certain data with the tenant-specific user ID. In another example, the other computing machine may submit a request to create a new record with the tenant-specific user ID. In response, the ID mapping engine 210 may attempt to find a global user ID mapped to the tenant-specific user ID received. In some embodiments, existing mappings of tenant-specific user IDs and global user IDs are stored in the ID mapping database 220. Thus, the ID mapping engine 210 may query the ID mapping database 220 using the tenant-specific user ID received. If the query is successful, then the ID mapping engine 210 may return the global user ID found. Otherwise, the ID mapping engine 210 may request the two-way mapping creating engine 240 to create a two-way mapping for the tenant-specific user ID received.

In some embodiments, the two-way mapping creating engine 240 looks up an unused global ID from the unused global ID repository 230. Then the two-way mapping creating engine 240 associates the unused global ID with the tenant-specific user ID received to create a two-way mapping. Immediately after creating the two-way mapping, the two-way mapping creating engine 240 may re-check the mapping to ensure there is no redundant mapping created by using the tenant-specific user ID received to query for a global user ID again and check if the global user ID returned is the same as the global user ID in the mapping just created. If they are the same, then there is no redundant mapping and the two-way mapping creating engine 240 makes the two-way mapping just created available to all other computing machines in the system. Otherwise, the two-way mapping creating engine 240 may delete the two-way mapping just created and use the other mapping instead.

Figure 3:
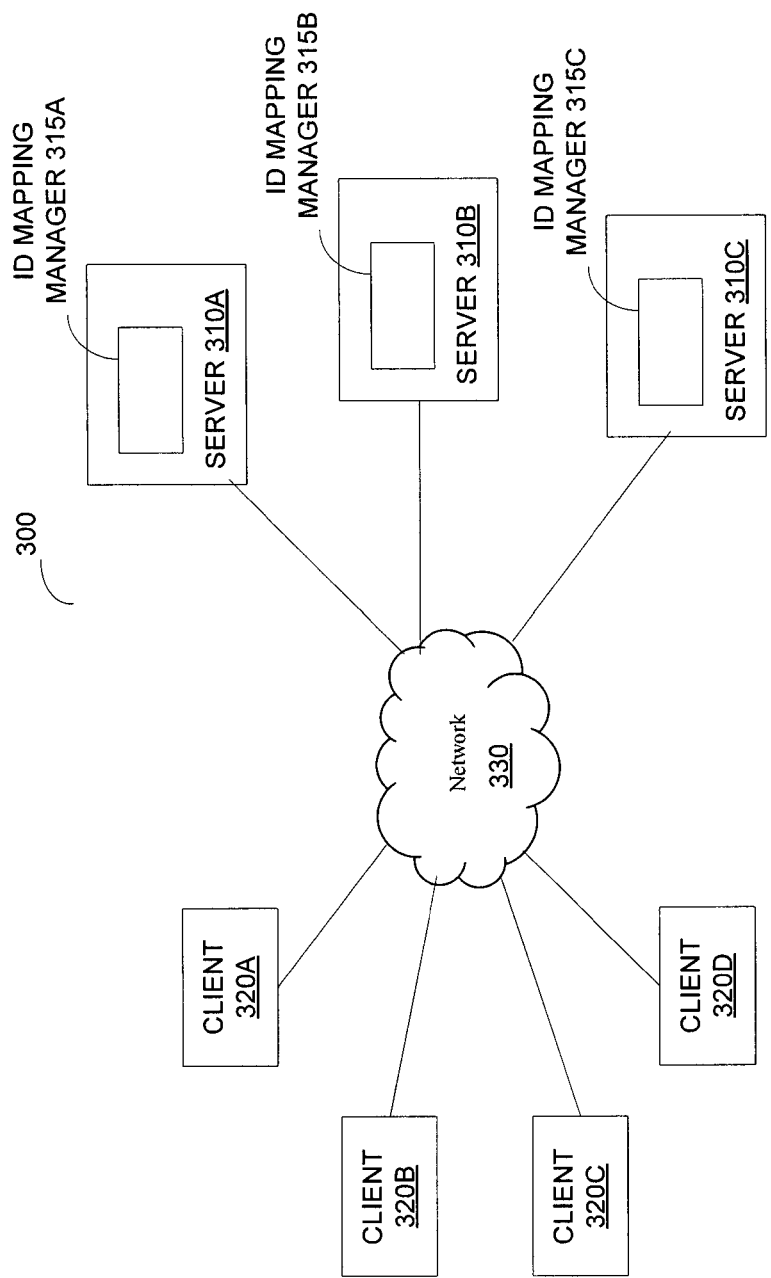
FIG. 3 illustrates one embodiment of a multi-tenant computing system.

FIG. 3 illustrates one embodiment of one embodiment of a multi-tenant computing system. The multi-tenant computing system 300 includes a number of servers 310A-310C, and a number of clients 320A-320D, coupled to each other via a network 330. In some embodiments, the network 330 can include a wide area network (WAN) (e.g., the Internet), a local area network (LAN), an Ethernet, etc. Note that the number of servers and clients in different embodiments may vary. Further, other embodiments of the multi-tenant computing system 300 may include additional components not shown. Each of the servers 310A-310C and the clients 320A-320D can be implemented using a computing machine, such as a desktop personal computer, a laptop computer, a tablet computer, a smartphone, a personal digital assistant (PDA), etc. An exemplary computing machine is discussed in details below with reference to FIG. 4.

Users belonging to different tenants may access the servers 310A-310C via the clients 320A-320D and the network 330. In some embodiments, a user of a tenant may log onto the system 300 using a tenant-specific user ID at one of the client 320A-320D. When the user accesses computing services offered by one or more of the servers 310A-310C (e.g., software applications, data storage, etc.), the tenant-specific user ID and a tenant ID uniquely identifying the tenant may be submitted to the servers 310A-310C.

In some embodiments, a set of global user IDs are divided among the servers 310A-310C so that each server knows the set for which it is authoritative. When one of the clients 320A-320D sends a tenant-specific user ID to one or more of the servers 310A-310C, it can be mapped to one of the servers 310A-310C. The servers 310A-310C may include ID mapping manager 315A-315C, respectively, to dynamically create two-way mappings of tenant-specific user IDs and global user IDs. Details of one embodiment of an ID mapping manager are discussed above with reference to FIG. 2.

FIG. 4 illustrates a diagrammatic representation of a machine in the exemplary form of a computer system 400 within which a set of instructions, for causing the machine to perform any one or more of the methodologies discussed herein, may be executed. In alternate embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 432.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processing device implementing other instruction sets, or processing devices implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the ID mapping manager 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a computer-readable storage medium) on which is stored one or more sets of instructions (e.g., ID mapping manager 422) embodying any one or more of the methodologies or functions described herein. The ID mapping manager 422 may also reside, completely or at least partially, within the main memory 404 and/or within the processing device 402 during execution thereof by the computer system 400, the main memory 404 and the processing device 402 also constituting computer-accessible storage media. The ID mapping manager 422 may further be transmitted or received over a network 420 via the network interface device 408.

While the computer-readable storage medium 430 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

The ID mapping manager 428, components and other features described herein (for example, in relation to FIGS. 1 and 2) can be implemented as discrete hardware components or integrated into the functionalities of hardware components, such as ASICS, FPGAs, DSPs, or similar devices. In addition, the ID mapping manager 428 can be implemented as firmware or functional circuitries within hardware devices. Further, the ID mapping manager 428 can be implemented in any combination of hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "making" or "creating" or "assigning" or "deleting" or "querying" or "re-checking" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Thus, some embodiments of a system and a method to dynamically create mappings between tenant-specific user IDs and global user IDs in a multi-tenant computing system have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
in response to a request to map a tenant user identifier (ID) pair comprising a tenant identifier (ID) and a tenant-specific user ID, creating, by a processing device, a mapping of the tenant user ID pair to a global user ID that is not yet used, the processing device being communicably coupled to servers in a networked system, and the tenant ID being associated with a tenant in the networked system;
after creating the mapping of the tenant user ID pair to the global user ID, checking, by the processing device, whether one of the servers has mapped the tenant user ID pair to another global user ID different from the global user ID during creation of the mapping; and
deleting, by the processing device, the mapping of the tenant user ID pair to the global user ID in response to determining that one of the servers has mapped the tenant user ID pair to another global user ID different from the global user ID.

2. The method of claim 1, further comprising:
causing, by the processing device, the servers in the networked system to map the tenant user ID pair to the global user ID after the mapping has been created; and
preventing, by the processing device, the servers from assigning another global user ID to the tenant user ID pair after the mapping has been created.

3. The method of claim 1, further comprising:
assigning, by the processing device, a second global user ID to a second tenant user identifier (ID) pair comprising a second tenant identifier (ID) and a second tenant-specific user ID, wherein the second global user ID is adjacent to the global user ID and the second tenant ID is associated with a second tenant different from the tenant associated with the tenant ID.

4. The method of claim 1, further comprising:
in response to receiving the tenant user ID pair, querying, by the processing device, for a global user ID mapped to the tenant user ID pair, if any; and
requesting, by the processing device, an unused global user ID if there is currently no global user ID mapped to the tenant user ID pair.

5. An apparatus comprising:
a network interface executable on a server, to couple to one or more servers of a networked system; and
a processing device executable on the server, to:
create a mapping of a tenant user identifier (ID) pair to a global user ID that is not yet used, the tenant user ID pair comprising a tenant identifier (ID) and a tenant-specific user ID, and the tenant ID being associated with a tenant in the networked system, and
after creating the mapping of the tenant user ID pair to the global user ID, checking whether one of the one or more servers has mapped the tenant user ID pair to another global user ID different from the global user ID during creation of the mapping; and
deleting the mapping of the tenant user ID pair to the global user ID in response to determining that one of the servers has mapped the tenant user ID pair to another global user ID different from the global user ID.

6. The apparatus of claim 5, wherein the processing device causes the servers in the networked system to map the tenant user ID pair to the global user ID after the mapping has been created and prevents the servers in the networked system from assigning another global user ID to the tenant user ID pair after the mapping has been created.

7. The apparatus of claim 5, wherein the processing device assigns a second global user ID to a second tenant user identifier (ID) pair comprising a second tenant identifier (ID) and a second tenant-specific user ID, wherein the second global user ID is adjacent to the global user ID and the second tenant ID is associated with a second tenant different from the tenant associated with the tenant ID.

8. The apparatus of claim 5, wherein the processing device queries for a global user ID mapped to the tenant user ID pair, if any, in response to receiving the tenant user ID pair, and requests an unused global user ID if there is currently no global user ID mapped to the tenant user ID pair.

9. A non-transitory computer-readable storage medium comprising instructions that, when executed by a processing device, cause the processing device to:
in response to a request to map a tenant user identifier (ID) pair comprising a tenant identifier (ID) and a tenant-specific user ID, create, by the processing device, a mapping of the tenant user ID pair to a global user ID that is not yet used, the processing device being communicably coupled to servers in a networked system, and the tenant ID being associated with a tenant in the networked system; and
after creating the mapping of the tenant user ID pair to the global user ID, check, by the processing device, whether one of the server has mapped the tenant user ID pair to another global user ID different from the global user ID while the processing device created the mapping; and
delete, by the processing device, the mapping of the tenant user ID pair to the global user ID in response to determining that one of the servers has mapped the tenant user ID pair to another global user ID different from the global user ID.

10. The non-transitory computer-readable storage medium of claim 9, wherein the processing device is further to:

cause the servers in the networked system to map the tenant user ID pair to the global user ID after the mapping has been created; and prevent the servers from assigning another global user ID to the tenant user ID pair after the mapping has been created.

11. The non-transitory computer-readable storage medium of claim 9, wherein the processing device is further to:

assign a second global user ID to a second tenant user identifier (ID) pair comprising a second tenant identifier (ID) and a second tenant-specific user ID, wherein the second global user ID is adjacent to the global user ID and the second tenant ID is associated with a second tenant different from the tenant associated with the tenant ID.

12. The non-transitory computer-readable storage medium of claim 9, wherein the processing device is further to:

in response to receiving the tenant user ID pair, query for a global user ID mapped to the tenant user ID pair, if any; and request an unused global user ID if there is currently no global user ID mapped to the tenant user ID pair.

\* \* \* \* \*